United States Patent
Lee et al.

(10) Patent No.: US 7,031,584 B2
(45) Date of Patent: Apr. 18, 2006

(54) METHOD FOR MANUFACTURING OPTICAL WAVEGUIDE USING LASER DIRECT WRITING METHOD AND OPTICAL WAVEGUIDE MANUFACTURED BY USING THE SAME

(75) Inventors: Woo Jin Lee, Jeonju-Shi (KR); Seung Ho Ahn, Daejon-Shi (KR); Keun Byoung Yoon, Daejon-Shi (KR); Myung Yung Jeong, Daejon-Shi (KR)

(73) Assignee: Electronics and Telecommunications Research Institute, (KR)

( * ) Notice: Subject to any disclaimer, the term of this patent is extended or adjusted under 35 U.S.C. 154(b) by 222 days.

(21) Appl. No.: 10/678,573

(22) Filed: Oct. 3, 2003

(65) Prior Publication Data

US 2004/0120676 A1    Jun. 24, 2004

(30) Foreign Application Priority Data

Dec. 23, 2002    (KR)    ............... 10-2002-0082851

(51) Int. Cl.
*G02B 6/10*    (2006.01)

(52) U.S. Cl. .................. 385/129; 385/37; 385/130; 385/131; 385/132

(58) Field of Classification Search .......... 385/37, 385/129–132
See application file for complete search history.

(56) References Cited

U.S. PATENT DOCUMENTS

| 3,865,625 A | 2/1975 | Cho et al. |
| 6,577,799 B1 * | 6/2003 | Charters et al. ............ 385/123 |
| 2003/0038251 A1 * | 2/2003 | Livesay et al. .......... 250/492.3 |

FOREIGN PATENT DOCUMENTS

| KR | 2001-0074638 | 8/2001 |
| WO | WO 00/02073 | 1/2000 |
| WO | WO 00/79320 | 12/2000 |

OTHER PUBLICATIONS

T/74 Photonics Conference 2002; "Improved Bending Loss of Laser Written Optical Waveguide", 2 pages.
IEEE Photonics Technology Letters, vol. 11, No. 12, Dec. 1999, "Improved Performance of Laser Written Channel Waveguides Using a TEM 01 Beam", pp. 1617-1619.

* cited by examiner

*Primary Examiner*—Jennifer Doan
(74) *Attorney, Agent, or Firm*—Blakely Sokoloff Taylor & Zafman

(57) ABSTRACT

A method of manufacturing an optical waveguide using a laser direct writing method is disclosed. More particularly, a method for improving refractive index profile of the optical waveguide by overlapping two or more beams using Gaussian laser beam is provided. In addition, it can accomplish an improved waveguide characteristics such as an offset structure of an S-bend type optical waveguide and an asymmetrical curve optical waveguide by individually adjusting the overlapped laser beams.

10 Claims, 5 Drawing Sheets

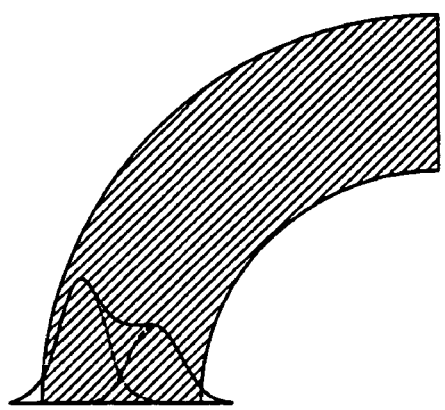
FIG. 6A
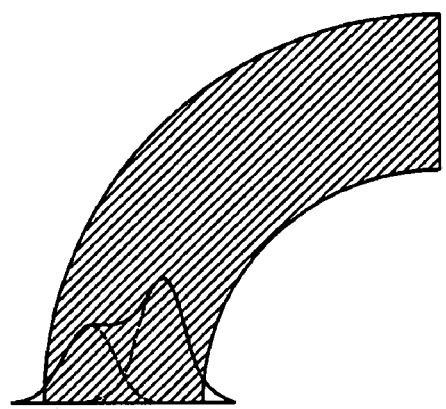
FIG. 6B
FIG. 7
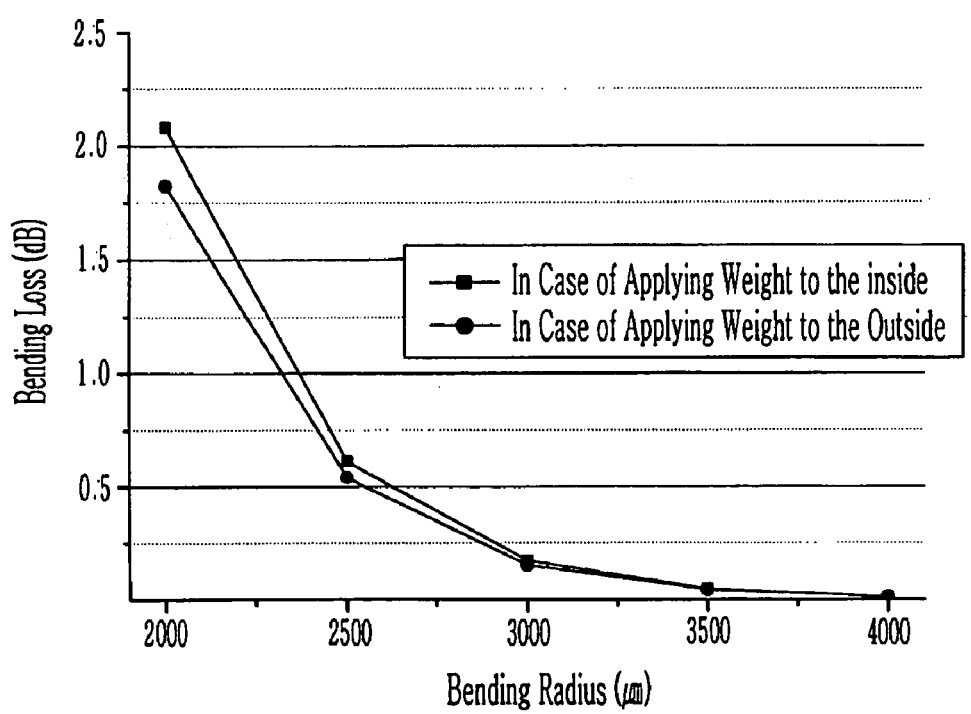

METHOD FOR MANUFACTURING OPTICAL WAVEGUIDE USING LASER DIRECT WRITING METHOD AND OPTICAL WAVEGUIDE MANUFACTURED BY USING THE SAME

BACKGROUND OF THE INVENTION

1. Field of the Invention

The present invention relates to a method for manufacturing an optical waveguide by a direct writing method and the optical waveguide manufactured by using the same, and more particularly, to a method of improving a refractive index profile of the optical waveguide by overlapping two or more beams using a Gaussian laser. Also, the present invention provides a method for manufacturing the optical waveguide which is capable of improving waveguide characteristics such as offset structure of a S-bend type optical waveguide and an asymmetrical curved optical waveguide by individually adjusting each of the overlapped laser beams, independently.

2. Description of the Prior Art

The method for manufacturing the optical waveguide using the laser direct writing method has the procedure of focusing the laser beam on a photo-sensitive polymer in order to pass through a writing process and increasing the refractive index of the written pattern to form the optical waveguide.

Up to now, an optical device and an optical component has been developed based on semiconductor material and inorganic silica system material for the purpose of implementing high speed of an optical communication, mass communication. But, recently, polymer material is the concerned about more and more, because it has merits such as a low cost and a simple process.

Various methods for manufacturing the optical waveguide have been used using the polymer material, and, in general, there are a photolithography method, a hot embossing method, a direct ultraviolet patterning method, and a laser direct writing method.

The photolithography method includes very complicate processes such as a step of coating a cladding material on a substrate, a step of baking, a step of coating a core material, a step of applying a photoresist, a step of exposing using a photomask, a step of developing and a step of etching.

In the hot embossing method, a core portion structure is molded in under clad material using a mold master, core material is inserted into the molded structure, an over clad is covered thereon, and ultraviolet rays are irradiated in order to cure the core material and adhere the over clad thereto.

In the ultraviolet direct patterning method, after a under clad is formed on a plane substrate, ultraviolet cured polymer is coated thereon as a core layer. And, after exposed to the ultraviolet ray by using the photomask, a core pattern is formed by using a polymer developer and then upper clad material is coated.

The laser direct writing method is based on a laser micro-machining technique. FIG. 1 is a concept diagram illustrating a general laser direct writing method. The light from the laser passes through a tunable neutral density filter and a shutter and is irradiated on the substrate through the objective lens of a microscope. On the substrate, the clad material is coated and then the core layer is coated. By simple process of focusing the laser beam on the core layer and writing a desired pattern, the optical waveguide can be manufactured. The refractive index of the pattern written by the laser becomes larger than that of the adjacent area, which is not written, and, the optical waveguide, therefore, is formed through total reflection principle.

The laser direct writing method has advantages in shortening of the process time, low cost and the application to large area, because of the simple process without the photomask.

However, in case the optical waveguide is implemented through the laser direct writing method according to prior art, it is difficult to implement a sharpness in boundary (between core material and clad material) of the optical waveguide, because of the nature of the light. The laser beam in the laser writing process has Gaussian distribution, the step profile of the core in the optical waveguide is not clearly formed. As a method for improving the step-like index profile of the optical waveguide, there is the laser direct writing method using a donut-shaped beam ($TEM_{01}$ mode). As a method for generating the donut-shaped beam, a diffracting phase mask or a hologram (CGH: Computer Generated Hologram) has been used.

Since the laser irradiates a light beam with a Gaussian distribution, the step profile of the optical waveguide is not clearly formed. It is why an additional bending loss in the curved region of the optical waveguide is caused.

SUMMARY OF THE INVENTION

Thus, in order to solve the above-mentioned problems, the object of the present invention is to provide a method of improving the refractive index profile of the optical waveguide, in the method for manufacturing the optical waveguide by using the laser direct writing method.

The another object of the present invention is to provide a method of improving the refractive index profile of the optical waveguide without an additional device such as the diffracting phase mask or the hologram in the donut mode beam, by overlapping two or more Gaussian beams to manufacture the optical waveguide.

The another object of the present invention is to provide a method of reducing a bending loss in the curved region of the optical waveguide through asymmetrical overlapping beams and a method for manufacturing a S-bending type optical waveguide having an offset structure.

In order to accomplish the above-mentioned object, one aspect of the present invention provides a method for manufacturing an optical waveguide using a laser direct writing method, comprising coating clad material on a substrate; coating photo-sensitive polymer on said clad material as a core layer; and forming the optical waveguide using a laser beam having Gaussian distribution, wherein the step of forming the optical waveguide includes the step of overlapping at least two laser beams.

Each of at least two laser beams overlapped in the laser direct writing method can be formed by varying at least one of the beam's size, the beam's intensity and writing speed. The refractive index profile of the optical waveguide can be asymmetrical.

The optical waveguide is formed in a bending structure, and, in the overlapped beam of said bending structure, the refractive index of the beam positioned at the outside is larger than that of the beam positioned at the other area.

Preferably, the number of said laser beams is two, the size and distance thereof is a few µm.

In addition, the step of overlapping at least two laser beams can comprise the steps of forming a first bending-shaped optical waveguide by using a first laser beam, and forming second bending-shaped optical waveguide by a second laser beam so as to be formed cross each other on any one surface of said first optical waveguide on the basis of the center of the bending curve of said formed first optical waveguide.

The other aspect of the present invention provides optical waveguide formed by a laser direct writing method comprising a substrate; clad material coated on said substrate; and photo-sensitive polymer coated on said clad material as a core layer, wherein the refractive index profile of said core layer has a structure manufactured by overlapping at least two laser beams having Gaussian type intensity distribution at a predetermined distance.

BRIEF DESCRIPTION OF THE DRAWINGS

FIGS. 6A and 6B illustrate an example that two Gaussian beams are overlapped and the beam has weight different from each other at the inside and the outside thereof.

FIG. 7 is a graph illustrating the bending loss due to the overlapped beam having weight different from each other at the inside and the outside thereof.

DESCRIPTION OF THE PREFERRED EMBODIMENTS

Hereinafter, the embodiments of the present invention will be explained with reference to the accompanying drawings. However, the embodiment of the present invention can be changed into a various type, and it should be not understood that the scope of the present invention is limit to the following embodiments. The embodiments of the present invention are provided in order to explain the present invention to those skilled in the art.

In manufacturing the optical waveguide, a clad material is coated on the plane substrate, and the photo-sensitive polymer is coated thereon as the core layer. For laser direct writing process, the laser beam is focused and irradiated on the core layer material and the size of the beam is adjusted to a desired size. The stage of substrate is moved to write the pattern of the optical waveguide. Alternatively, the laser beam may be moved. The refractive index of the exposed pattern becomes larger than that of the material, which not exposed, the optical waveguide is formed through the total reflection principle.

In the present invention, the method for overlapping two or more beams to manufacture the optical waveguide is provided such that the refractive index profile of the core in the optical waveguide has a step-like index profile.

The laser direct writing method using the overlapped beams has an advantage in the refractive index of the optical waveguide can be controlled without the additional device such as the phase mask or the hologram in the donut-shaped beam.

Figure 2A:
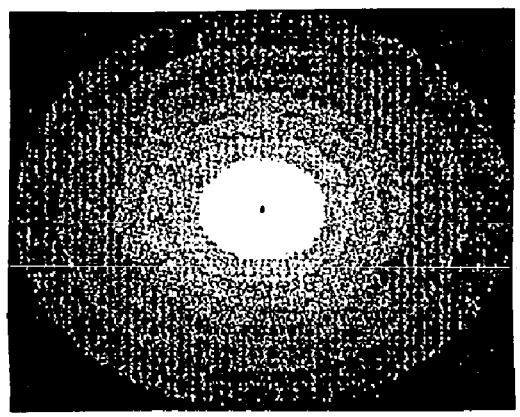
FIG. 2A is a photograph of a Gaussian beam.
Figure 2B:
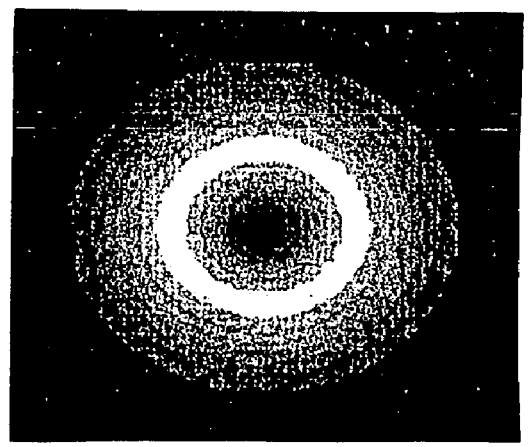
FIG. 2B is a photograph of a donut-shaped beam.
Figure 2C:
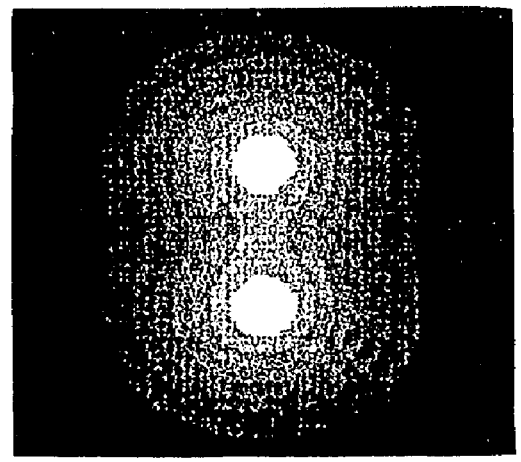
FIG. 2C is a photograph of an overlapped Gaussian beam.

In FIG. 2, various kinds of the beam modes used in manufacturing the optical waveguide are shown. FIG. 2A is a photograph of Gaussian beam, FIG. 2B is a photograph of a donut-shaped beam, and FIG. 2C is a photograph of an overlapped Gaussian beam.

The refractive index profile in the core of the optical waveguide is determined in accordance with total amount of the energy which the photo-sensitive material receives in a specific point, and, in detail, it can be obtained by integrating the intensity distribution of the beam in the writing process with respect to the propagating direction of the beam.

Figure 1:
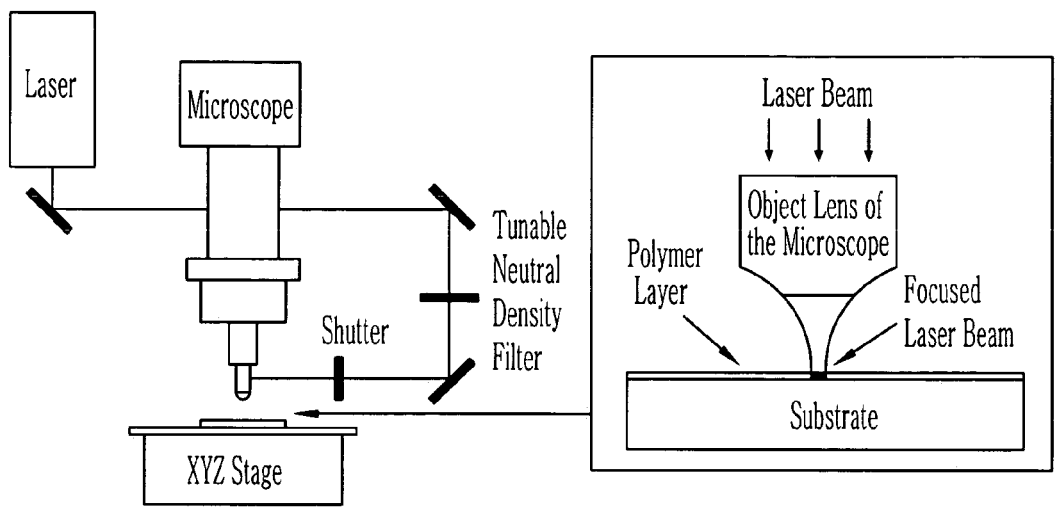
FIG. 1 is a concept diagram illustrating a direct writing method.
Figure 3A:
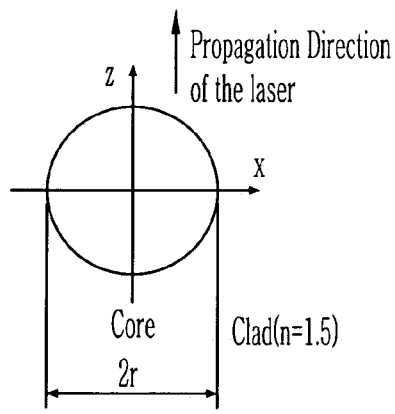
FIGS. 3A and 3B are concept diagrams comparing a single Gaussian beam according to prior art with an overlapped Gaussian beam according to the present invention.
Figure 3B:
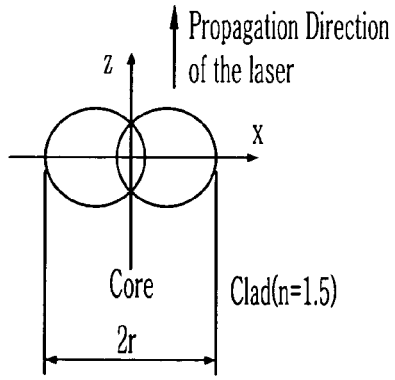

FIGS. 3A and 3B are concept diagrams comparing a single Gaussian beam according to the prior art with the overlapped Gaussian beam according to the present invention.

The formation of the core of the optical waveguide in the laser direct writing process varies according to laser beam's size, laser beam's intensity, and writing speed, and the variation of the refractive index is generally determined by a total exposure amount irradiated on the core region. These can be expressed with two equations as follows:

$$N_{core} = n_{clad} + \Delta n(x) \quad (1)$$

$$\Delta n(x) \approx C_0 \int_{-\sqrt{r^2-x^2}}^{\sqrt{r^2-x^2}} \exp \frac{-2(x^2+z^2)}{r^2} \quad (2)$$

Here, $C_0$ is a constant determined by a charateristics of written material and writing speed.

Figure 4:
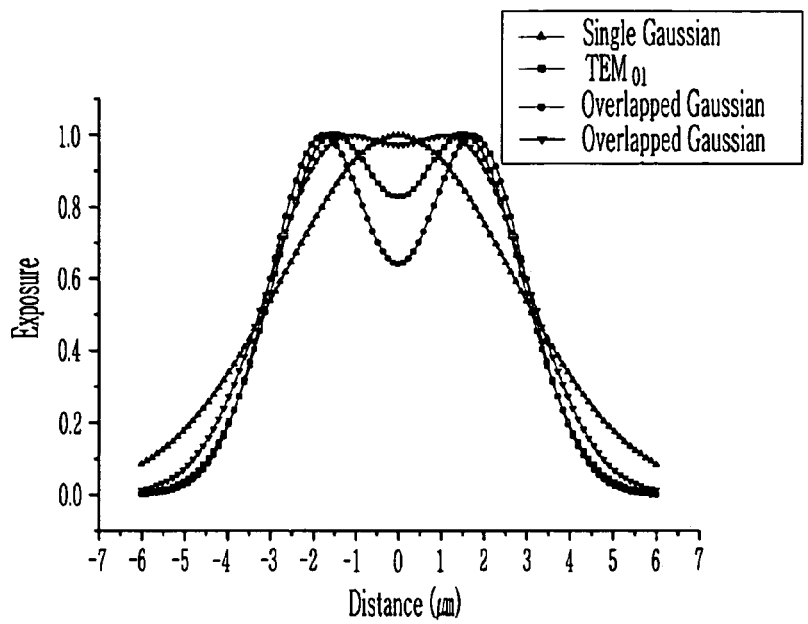
FIG. 4 is a graph illustrating energy distributions which optical waveguides are subjected by the single Gaussian beam, the donut-shaped beam, and the overlapped Gaussian beam in a computer simulation.

FIG. 4 is a graph illustrating a energy distribution in optical waveguides of the signal Gaussian beam, the donut-shaped beam and the overlapped Gaussian beam in a computer simulation, respectively. Since the variation in the refractive index of the photo-sensitive polymer has a linearity before the saturation area of the refractive index, the energy distribution in which the optical waveguide has a shape similar to the shape of the refractive index variation. Therefore, by adjusting the beam size and the distance between the overlapped Gaussian beams, the profile of the border of the core in the optical waveguide can be implemented in the shape similar to the step shape than the shape, which is implemented by the donut-shaped beam.

In the computer simulation in FIG. 4, the graph of the single Gaussian beam shows the refractive index profile in the optical waveguide, which is formed with the single Gaussian beam having a diameter of 6 μm. The graph of the TEM$_{01}$ mode shows a case using the donut-shaped beam (TEM$_{01}$ mode) in order to improve the refractive index profile of the optical waveguide according to the prior art. In addition, the line graph consisting circular dots shows a case of writing the pattern by overlapping the Gaussian beams, having a diameter of 2.4 μm, spaced a distance of 3.6 μm apart each other. The line graph consisting inverted triangles shows a case of writing the pattern by overlapping the single Gaussian beams having diameter of 3 μm at distances of 3.3 μm.

As seen from FIG. 4, the refractive index profile in the optical waveguide generated by the overlapped beams has the shape similar to the step shape, in comparison with the single Gaussian beam, and the size of the beam and the distance between the beams can be adjusted as needed. In particular, the Gaussian beam having diameter of 3 μm, overlapped at distances of 3.3 μm, has a improvement in comparison with the donut-shaped beam. On the other hand, in case of fine-tuning the diameter and the distance, the effect can be improved. Furthermore, the change in the number of the overlapped beams brings about improvement in effect.

Next, the bending loss in case of using the overlapped Gaussian beam of the present invention is explained.

Figure 5:
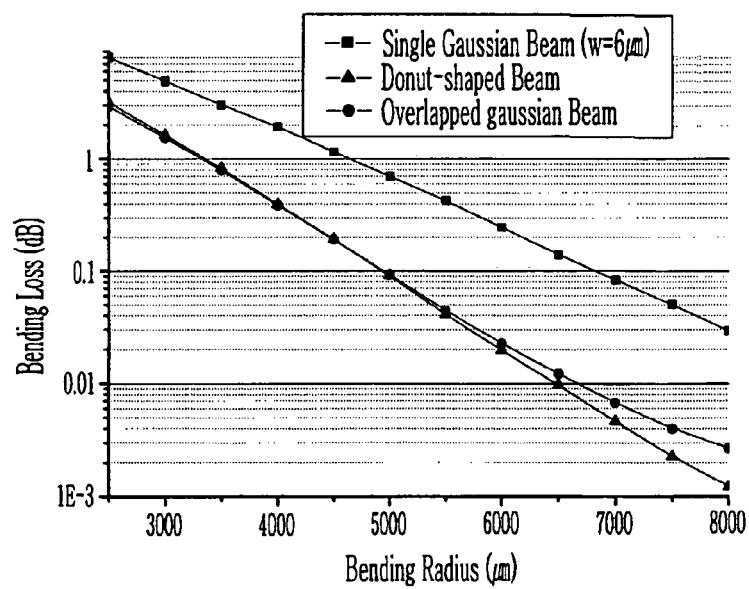
FIG. 5 is a graph illustrating bending losses of a curved optical waveguide with a rotation of 45 degree with respect to the single Gaussian beam, the donut-shaped beam (TEM$_{01}$ mode beam), and the overlapped Gaussian beam.

To compare the bending loss in each case, the bending loss of the curved optical waveguide with a rotation of 45 degree with respect to the $TEM_{01}$, and the overlapped Gaussian beam were calculated. Observing the computer simulation condition, the refractive index in the clad area of the optical waveguide is supposed to be 1.5 and $\Delta n_{max}$ is fixed to be 0.01125. The bending loss of the optical waveguide after a rotation of 45 degree is calculated using BPM (Beam Propagation Method). At a result, the larger the size of the beam is, the smaller the bending loss is. The bending losses were calculated in each case, that is to say, the optical waveguide of single beam, the optical waveguide of the overlapped beam and the optical waveguide of the donut mode $TEM_{01}$ beam, which is known to form the border surface of the optical waveguide sharply. FIG. 5 is a graph illustrating the bending loss of the curved optical waveguide with a rotation of 45 degree with respect to the donut mode $TEM_{01}$ beam and the overlapped Gaussian beam. The overlapped beam and the donut-shaped beam have bending loss similar to each other and have the improved bending loss, compared with that of the optical waveguide of the single beam.

Next, the optical waveguide device has an improved waveguide performance by adjusting the size and the intensity of the overlapped beam of the optical waveguide, individually. The bending loss is reduced by increasing the difference between the refractive indexes at the outside of the curve area in the optical waveguide and the optical waveguide device can be implemented by adjusting the overlapped beams individually. The present invention provides the method of reducing the bending loss of the optical waveguide by increasing the strength of the laser beam forming the outside of the curve and lowering the writing speed to form the asymmetrical optical waveguide with respect to the propagating direction when manufacturing the curved optical waveguide using the laser direct writing method.

In FIGS. 6A and 6B, the two Gaussian beams are overlapped, but the size of the beam at outside is different that of at inside. That is, the bending loss is remarkably improved by overlapping two Gaussian beams with appropriate weight. This result is shown in FIG. 7. Referring to FIG. 7, in case the bending radius R is about 3000 μm, the bending loss of the overlapped beam with different weights is about 0.3 dB. But, as shown in FIG. 5, in case where the bending radius R is about 3000 μm, the bending loss of the overlapped beams having same weights is about 1 dB. Accordingly, it is found that the bending loss is improved.

On the other hand, the above-mentioned method is applicable to the offset structure in order to reduce the mode mismatch loss. The offset structure functions as the bending loss of the S-bend type optical waveguide in various kinds of the optical devices such as an optical splitter or an optical directional coupler, and the general offset structure has a arrangement with two optical waveguides crossed each other. However, it is difficult that the laser direct writing method accomplish the shape of the optical waveguide at the starting point and the ending point of the writing process, definitely. In particular, in the direct writing method, it is difficult to implement the offset structure due to the continuity of the writing process. In order to solve these problems, the overlapped Gaussian beams according to the present invention is used, so that the offset structure can be easily implemented.

Figure 8:
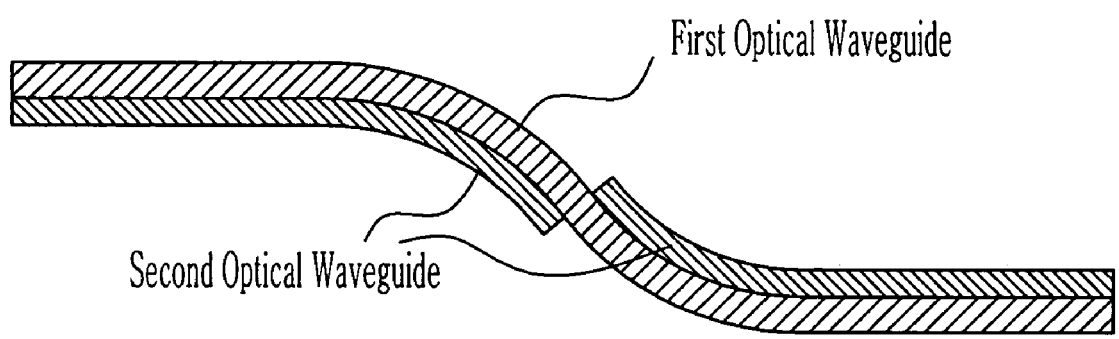
FIG. 8 illustrates an offset structure according to the preferred embodiment of the present invention.

The offset structure of this method is shown in FIG. 8. The first beam is written into a first optical waveguide. The second beams are written into a second optical waveguide in order to have a bending-shaped with two portions. The two portions of second optical waveguide are formed in each side of the first optical waveguide, crossed each other with respect to the center of the bending curve of the first optical waveguide. The second writing beams can be adjusted, individually, to acquire the asymmetrical optical waveguide.

Although the present invention has been illustrated and described with respect to exemplary embodiments thereof, the present invention should not be understood as limited to the specific embodiment, and it should be understood by those skilled in the art that the foregoing and various other changes, omission and additions may be made therein and thereto, without departing from the spirit and scope of the present invention.

As mentioned above, the present invention can provide the method for improving the refractive index profile using the overlapped beam in the laser direct writing method and the method for improving the bending loss of the curved optical waveguide.

In addition, it is applicable to devices such as an optical directional coupler, an optical splitter, an optical switch by using the offset structure of an S-bend type optical waveguide and an asymmetrical optical waveguide manufactured by the overlapped beams.

What is claimed is:

1. A method for manufacturing an optical waveguide using a laser direct writing method, comprising:
   coating clad material on a substrate;
   coating photo-sensitive polymer on said clad material as a core layer; and
   forming the optical waveguide using a laser beam having Gaussian distribution,
   wherein the step of forming the optical waveguide includes the step of overlapping at least two laser beams.

2. The method according to claim 1, wherein each of the at least two laser beams has difference each other in at least one of the beam's size, the beam's intensity and writing speed.

3. The method according to claim 2, wherein the refractive index profile of the optical waveguide is asymmetrical.

4. The method according to claim 1, wherein said optical waveguide is formed with a bending structure.

5. The method according to claim 4, wherein in the overlapped beam of said bending structure, the refractive index of the beam in the outside is larger than that of the beam positioned in the inside.

6. The method according to claim 1, wherein the number of said laser beams is two, the size and length thereof is few μm.

7. The method according to claim 1, wherein the step of overlapping the at least two laser beams comprising:
   forming a first bending-shaped optical waveguide using a first laser beam; and
   forming a second bending-shaped optical waveguide having two portions using a second laser beam, wherein the each portion of the second bending-shaped optical waveguides are formed on sides of the first optical waveguides, crossed each other with respect to the center of the bending curve of the first optical waveguide, wherein the first bending-shaped optical waveguide overlaps the second bending-shaped optical waveguide.

8. The optical waveguide according to claim 7, wherein said at least two optical waveguides comprise a first bending-shaped optical waveguide using a first laser beam and a second bending-shaped optical waveguide having two portions using a second laser beam, wherein the each portion of the second bending-shaped optical waveguide is formed on side of the first optical waveguides, crossed each other with respect to the center of the bending curve of the first optical waveguide.

9. An optical waveguide formed by a laser direct writing method, comprising:
   a substrate;
   clad material coated on said substrate; and
   photo-sensitive polymer coated on said clad material as a core layer,
   wherein the refractive index profile of said core layer has a structure of overlapping at least two laser beams having Gaussian distribution, spaced a predetermined distance apart each other.

10. The optical waveguide according to claim 9, wherein said optical waveguide has a bending structure, and the refractive index of the beam in the outside of said bending structure is larger than that of the beam in the inside.

* * * * *